(12) United States Patent
Hamano

(10) Patent No.: US 10,958,033 B2
(45) Date of Patent: Mar. 23, 2021

(54) LASER APPARATUS

(71) Applicant: Gigaphoton Inc., Tochigi (JP)

(72) Inventor: Hiroaki Hamano, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/507,075

(22) Filed: Jul. 10, 2019

(65) Prior Publication Data

US 2019/0334311 A1   Oct. 31, 2019

Related U.S. Application Data

(63) Continuation of application No. PCT/JP2017/005954, filed on Feb. 17, 2017.

(51) Int. Cl.

| | |
|---|---|
| *H01S 3/23* | (2006.01) |
| *B23K 26/062* | (2014.01) |
| *B23K 26/064* | (2014.01) |
| *B23K 26/03* | (2006.01) |
| *B23K 26/06* | (2014.01) |
| *H01S 3/097* | (2006.01) |
| *H01S 3/00* | (2006.01) |

(52) U.S. Cl.
CPC .......... *H01S 3/2308* (2013.01); *B23K 26/032* (2013.01); *B23K 26/062* (2015.10); *B23K 26/064* (2015.10); *B23K 26/0665* (2013.01); *H01S 3/0071* (2013.01); *H01S 3/097* (2013.01)

(58) Field of Classification Search
CPC ..... H01S 3/2308; H01S 3/0071; H01S 3/1305
See application file for complete search history.

(56) References Cited

U.S. PATENT DOCUMENTS 6,069,730 A * 5/2000 Injeyan ............... H01S 3/10076
359/334
6,310,715 B1 * 10/2001 Moore .................... H01S 3/005
359/334

(Continued)

FOREIGN PATENT DOCUMENTS

| CA | 2 340 315 A1 | 9/2001 |
|---|---|---|
| EP | 1 133 034 A2 | 9/2001 |

(Continued)

OTHER PUBLICATIONS

International Search Report issued in PCT/JP2017/005954; dated May 9, 2017.

(Continued)

*Primary Examiner* — Yuanda Zhang
(74) *Attorney, Agent, or Firm* — Studebaker & Brackett PC

(57) ABSTRACT

A laser apparatus includes: a master oscillator for emitting a laser beam; an amplifier on an optical path of the laser beam; a beam splitter between the master oscillator and the amplifier for separating, from the optical path of the laser beam, at least part of a return beam traveling through the optical path of the laser beam in a direction opposite to a traveling direction of the laser beam; a focusing optical system for focusing the return beam separated from the optical path; and an optical sensor having a light receiving surface for the return beam for detecting information on power of the return beam entering the light receiving surface through the focusing optical system, the light receiving surface being arranged at a position different from a focusing position of the focusing optical system on the optical path of the return beam.

5 Claims, 4 Drawing Sheets

(56) References Cited

U.S. PATENT DOCUMENTS

| | | | |
|---|---|---|---|
| 6,670,574 B1* | 12/2003 | Bates | B23K 26/03 |
| | | | 219/121.63 |
| 2001/0022793 A1 | 9/2001 | Yokoyama | |
| 2002/0075910 A1 | 6/2002 | Imaki et al. | |
| 2009/0283679 A1* | 11/2009 | Murayama | H01L 31/02327 |
| | | | 250/338.1 |
| 2011/0091155 A1* | 4/2011 | Yilmaz | H01S 3/10015 |
| | | | 385/30 |
| 2014/0133871 A1 | 5/2014 | Iemura et al. | |
| 2014/0193165 A1 | 7/2014 | Kim | |
| 2015/0180192 A1* | 6/2015 | Tsushima | H01S 3/038 |
| | | | 372/29.013 |
| 2015/0351208 A1* | 12/2015 | Suganuma | H01S 3/2316 |
| | | | 250/504 R |
| 2017/0317464 A1 | 11/2017 | Kurosawa et al. | |

FOREIGN PATENT DOCUMENTS

| | | |
|---|---|---|
| JP | H04-102239 A | 4/1992 |
| JP | H09-320095 A | 12/1997 |
| JP | 2001-257419 A | 9/2001 |
| JP | 2002-237651 A | 8/2002 |
| JP | 2006-343298 A | 12/2006 |
| JP | 2013-201368 A | 10/2013 |
| JP | 2014-112650 A | 6/2014 |
| WO | 2016/142995 A1 | 9/2016 |

OTHER PUBLICATIONS

Written Opinion issued in PCT/JP2017/005954; dated May 9, 2017.
An Office Action mailed by the Japanese Patent Office dated Jun. 23, 2020, which corresponds to Japanese Patent Application No. 2019-500136 and is related to U.S. Appl. No. 16/507,075.

* cited by examiner

LASER APPARATUS

CROSS-REFERENCE TO RELATED APPLICATIONS

The present application is a continuation application of International Application No. PCT/JP2017/005954 filed on Feb. 17, 2017. The content of the application is incorporated herein by reference in its entirety.

BACKGROUND

Technical Field

The present disclosure relates to a laser apparatus.

Related Art

Recently, miniaturization of semiconductor processes has involved increasing miniaturization of transfer patterns for use in photolithography of the semiconductor processes. In the next generation, microfabrication at 20 nm or less will be required. Thus, development of an exposure apparatus is expected including a combination of an apparatus for generating extreme ultraviolet (EUV) light having a wavelength of about 13 nm and reduced projection reflection optics.

Three types of EUV light generation apparatuses have been proposed: an LPP (Laser Produced Plasma) type apparatus using plasma generated by irradiating a target substance with a laser beam, a DPP (Discharge Produced Plasma) type apparatus using plasma generated by discharge, and an SR (Synchrotron Radiation) type apparatus using synchrotron radiation.

LIST OF DOCUMENTS

Patent Documents

Patent Document 1: Japanese Unexamined Patent Application Publication No. 4-102239
Patent Document 2: Japanese Unexamined Patent Application Publication No. 2006-343298
Patent Document 3: International Patent Publication No. 2016/142995
Patent Document 4: Japanese Unexamined Patent Application Publication No. 9-320095

SUMMARY

A laser apparatus according to one aspect of the present disclosure may include: a master oscillator configured to emit a laser beam; an amplifier arranged on an optical path of the laser beam emitted from the master oscillator; a beam splitter arranged between the master oscillator and the amplifier, and configured to separate, from the optical path of the laser beam, at least part of a return beam traveling through the optical path of the laser beam in a direction opposite to a traveling direction of the laser beam; a focusing optical system configured to focus the return beam separated from the optical path of the laser beam by the beam splitter; and an optical sensor having a light receiving surface for the return beam, and configured to detect information on power of the return beam entering the light receiving surface through the focusing optical system, the light receiving surface being arranged at a position different from a focusing position of the focusing optical system on the optical path of the return beam.

A laser apparatus according to another aspect of the present disclosure may include: a master oscillator configured to emit a laser beam; an amplifier arranged on an optical path of the laser beam emitted from the master oscillator; a beam splitter arranged between the master oscillator and the amplifier, and configured to separate, from the optical path of the laser beam, at least part of a return beam traveling through the optical path of the laser beam in a direction opposite to a traveling direction of the laser beam; a focusing optical system configured to focus the return beam separated from the optical path of the laser beam by the beam splitter; and an optical sensor having a light receiving surface for the return beam, and configured to detect information on power of the return beam entering the light receiving surface through the focusing optical system, the light receiving surface being arranged in an inclined manner with respect to an optical axis of the return beam entering the light receiving surface.

BRIEF DESCRIPTION OF THE DRAWINGS

With reference to the accompanying drawings, some embodiments of the present disclosure will be described below merely by way of example.

DESCRIPTION OF EMBODIMENTS

Figure 1:
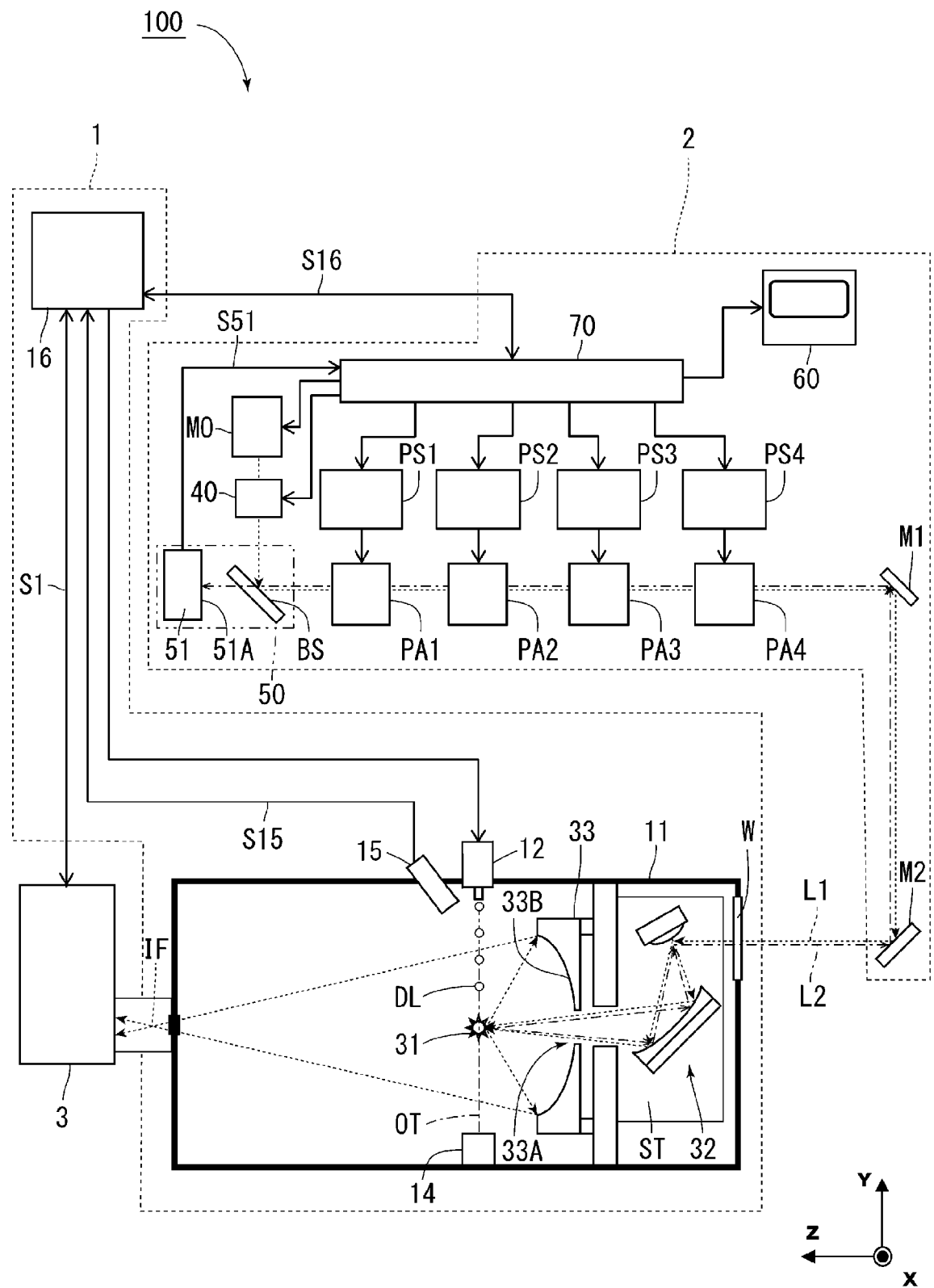
FIG. 1 diagrammatically shows a schematic exemplary configuration of an entire extreme ultraviolet light generation system.

1. Overview
2. Description of extreme ultraviolet light generation system
   2.1 Overall configuration
   2.2 Operation
3. Description of return beam module of comparative example
   3.1 Configuration
   3.2 Operation
   3.3 Problem
4. Description of return beam module of Embodiment 1
   4.1 Configuration
   4.2 Operation
   4.3 Effect
   4.4 Variant
5. Description of return beam module of Embodiment 2
   5.1 Configuration
   5.2 Operation
   5.3 Effect
6. Description of return beam module of Embodiment 3
   6.1 Configuration
   6.2 Operation
   6.3 Effect 7. Description of return beam module of Embodiment 4
7.1 Configuration
7.2 Operation
7.3 Effect Now, with reference to the drawings, embodiments of the present disclosure will be described in detail.

The embodiments described below illustrate some examples of the present disclosure, and do not limit contents of the present disclosure. Also, all configurations and operations described in the embodiments are not necessarily essential as configurations and operations of the present disclosure.

Like components are denoted by like reference numerals, and overlapping descriptions are omitted.

1. Overview

Embodiments of the present disclosure relate to an extreme ultraviolet (EUV) light generation apparatus that generates light having a wavelength of extreme ultraviolet light, and a laser apparatus used for generating the light. Hereinafter, the extreme ultraviolet light is sometimes referred to as EUV light, and a controller for generating the EUV light is sometimes referred to as an EUV light generation control unit.

2. Description of Extreme Ultraviolet Light Generation System

2.1 Overall Configuration

FIG. 1 diagrammatically shows a schematic exemplary configuration of an entire extreme ultraviolet light generation system. As shown in FIG. 1, an EUV light generation system 100 includes an extreme ultraviolet light generation apparatus 1 and a laser apparatus 2. The EUV light generation system 100 is used together with an exposure apparatus 3.

The exposure apparatus 3 exposes a semiconductor wafer to EUV light generated by the extreme ultraviolet light generation apparatus 1, and outputs a burst signal S1 to the extreme ultraviolet light generation apparatus 1. The burst signal S1 designates a burst period for generating the EUV light and an intermission period for stopping generation of the EUV light. For example, a burst signal S1 to alternately repeat the burst period and the intermission period is output from the exposure apparatus 3 to the extreme ultraviolet light generation apparatus 1.

The extreme ultraviolet light generation apparatus 1 includes a chamber 11 and a target supply unit 12. The chamber 11 is a container that can be sealed and reduced in pressure. The target supply unit 12 is configured to supply a target substance as a droplet DL into the chamber 11, and, for example, mounted to extend through a wall of the chamber 11. A material of the target substance may include tin, terbium, gadolinium, lithium, or xenon, or any combinations of two or more of them, but not limited to them.

The wall of the chamber 11 has at least one through hole. The through hole is closed by a window W, and a laser beam L1 enters the chamber 11 through the window W.

In the chamber 11, part of a trajectory OT of the droplet DL supplied from the target supply unit 12 is a plasma generating region 31. The plasma generating region 31 is a region where the droplet DL is turned into plasma. The laser beam L1 entering the chamber 11 through the window W is focused on the plasma generating region 31 by a laser beam focusing optical system 32.

The laser beam focusing optical system 32 may include, for example, a convex mirror that expands and reflects the laser beam L1 having entered the chamber 11, and a concave mirror that reflects and focuses the expanded laser beam L1 and guides the laser beam L1 to the plasma generating region 31. The laser beam focusing optical system 32 may be arranged on a stage ST movable in three axial directions so that a focusing position of the laser beam focusing optical system 32 can be controlled.

In the chamber 11, an EUV light focusing mirror 33 is also provided. The EUV light focusing mirror 33 has a through hole 33A through which the laser beam L1 focused by the laser beam focusing optical system 32 passes. The EUV light focusing mirror 33 has a spheroidal reflection surface 33B that reflects EUV light generated by the droplet DL reaching the plasma generating region 31 and being turned into plasma. For example, the EUV light focusing mirror 33 is arranged so that a first focal point is located on the plasma generating region 31 and a second focal point is located on an intermediate focal point IF.

The extreme ultraviolet light generation apparatus 1 further includes a target recovery unit 14, a target sensor 15, and an EUV light generation control unit 16. The target recovery unit 14 is configured to recover the droplet DL that has not been turned into plasma in the plasma generating region 31 among the droplets DL supplied into the chamber 11. For example, the target recovery unit 14 is provided on the trajectory OT of the droplet DL on a wall of the chamber 11 opposite to a wall to which the target supply unit 12 is mounted.

The target sensor 15 is configured to detect information on presence, a path, a position, a speed, or the like of the droplet DL supplied into the chamber 11 and output the information as a droplet-related signal S15. For example, the target sensor 15 is provided to extend through the wall of the chamber 11.

The EUV light generation control unit 16 is a computer including a CPU (central processing unit) or the like. The EUV light generation control unit 16 is configured to perform various types of control based on the burst signal S1 output from the exposure apparatus 3, the droplet-related signal S15 output from the target sensor 15, or the like.

For example, the EUV light generation control unit 16 controls the target supply unit 12 to adjust output timing of the droplet DL, an output direction of the droplet DL, or the like based on the burst signal S1 and the droplet-related signal S15. Also, for example, the EUV light generation control unit 16 outputs a light emission trigger signal S16 to the laser apparatus 2 based on the burst signal S1 and the droplet-related signal S15, and controls the laser apparatus 2 to perform a burst operation. The burst operation means an operation of emitting a continuous pulsed laser beam L1 at a predetermined repetition frequency in the burst period and preventing emission of the laser beam L1 in the burst intermission period.

The above control by the EUV light generation control unit 16 is merely exemplary, and different control may be added as required.

The laser apparatus 2 includes a master oscillator MO that is a light source for the burst operation. The master oscillator MO emits the pulsed laser beam L1. The master oscillator MO is, for example, an oscillator that excites a gas containing helium, nitrogen, or the like mixed into carbon dioxide by discharge and thus emits a laser beam. Alternatively, the master oscillator MO may be a quantum cascade laser oscillator.

The laser apparatus 2 further includes an optical isolator 40, a beam splitter BS, a first power amplifier PA1, a second power amplifier PA2, a third power amplifier PA3, a fourth power amplifier PA4, a first mirror M1, and a second mirror M2.

The optical isolator 40 is arranged between the master oscillator MO and the beam splitter BS on the optical path of the laser beam L1. The optical isolator 40 is configured to transmit or block the laser beam L1 emitted from the master oscillator MO. For example, the optical isolator 40 may include an EO pockels cell and a polarizer.

The beam splitter BS is arranged between the optical isolator 40 and the first power amplifier PA1 on the optical path of the laser beam L1. For example, the beam splitter BS reflects part of the laser beam L1 and guides the part of the laser beam L1 to the first power amplifier PA1. For example, the beam splitter BS may include a planar dielectric multilayer and an infrared transmission substrate, or the like.

The first power amplifier PA1, the second power amplifier PA2, the third power amplifier PA3, and the fourth power amplifier PA4 are arranged on the optical path of the laser beam L1. The first power amplifier PA1, the second power amplifier PA2, the third power amplifier PA3, and the fourth power amplifier PA4 are configured to amplify power of the entering laser beam L1. For example, the first power amplifier PA1, the second power amplifier PA2, the third power amplifier PA3, and the fourth power amplifier PA4 each may be a regenerative power amplifier.

The first power amplifier PA1, the second power amplifier PA2, the third power amplifier PA3, and the fourth power amplifier PA4 may have the same configuration or different configurations. In the example in FIG. 1, the number of the power amplifiers is four, but may be any number other than four.

A first power supply PS1 that supplies power for operating the power amplifier is connected to the first power amplifier PA1. Similarly, a second power supply PS2 is connected to the second power amplifier PA2, a third power supply PS3 is connected to the third power amplifier PA3, and a fourth power supply PS4 is connected to the fourth power amplifier PA4.

The first mirror M1 and the second mirror M2 are arranged between the fourth power amplifier PA4 and the laser beam focusing optical system 32 on the optical path of the laser beam L1. The first mirror M1 and the second mirror M2 reflect the laser beam L1 with high reflectivity. For example, the first mirror M1 and the second mirror M2 each may include a planar dielectric multilayer and a metal substrate, or the like.

The first mirror M1 and the second mirror M2 may have the same configuration or different configurations. In the example in FIG. 1, the number of the mirrors is two, but may be three or more.

An actuator (not shown) is connected to each of the first mirror M1 and the second mirror M2, and the actuator can be operated to adjust a position and an angle of a reflection surface. Thus, the first mirror M1 and the second mirror M2 each can adjust the traveling direction of the laser beam L1 reflected by the reflection surface. Thus, the first mirror M1 and the second mirror M2 each can be considered as a beam traveling direction adjustment unit that adjusts the traveling direction of the laser beam L1.

The laser apparatus 2 further includes a return beam module 50, a display device 60, and a laser control unit 70. The return beam module 50 includes the beam splitter BS and an optical sensor 51. The beam splitter BS is used as an optical element that reflects part of the laser beam L1 and also as an optical element that separates part of a return beam L2 of the laser beam L1. The return beam L2 travels through the optical path of the laser beam L1 in a direction opposite to the traveling direction of the laser beam L1. For example, a droplet DL having reached the plasma generating region 31, an optical element on the optical path of the laser beam L1, or the like may serve as a reflection surface that reflects part of the laser beam L1. In this case, at least part of the laser beam L1 reflected by the reflection surface is the return beam L2. For example, the beam splitter BS transmits one part of the return beam L2 and reflects the other part of the return beam L2, thereby separating the one part of the return beam L2 from the optical path of the laser beam L1.

The optical sensor 51 includes a light receiving surface 51A for the return beam L2. The optical sensor 51 is configured to detect information on power of the return beam L2 on the light receiving surface 51A, and output the information as a power-related signal S51. The information on the power of the return beam L2 may be a value indicating an amount of energy of the return beam L2 per unit time or an image showing energy distribution of the return beam L2 as long as the laser control unit 70 can recognize the power of the return beam L2 from the information. If the value indicating an amount of energy of the return beam L2 per unit time is output as the power-related signal S51, the optical sensor 51 may include, for example, a power meter.

The display device 60 is configured to display the information provided from the laser control unit 70 on a display screen. For example, the display device 60 may include a display such as a liquid crystal display or an EL (electro luminescence) display, or a PC (personal computer) including the display.

The laser control unit 70 is a computer including a CPU (central processing unit) or the like, and is connected to the EUV light generation control unit 16, the master oscillator MO, the optical isolator 40, the optical sensor 51, the first power supply PS1, the second power supply PS2, the third power supply PS3, the fourth power supply PS4, and the display device 60. The laser control unit 70 is configured to perform various types of control based on the light emission trigger signal S16 output from the EUV light generation control unit 16, the power-related signal S51 output from the optical sensor 51, or the like.

For example, the laser control unit 70 controls the first power supply PS1, the second power supply PS2, the third power supply PS3, and the fourth power supply PS4 to drive the power amplifiers before controlling the master oscillator MO so that the power amplifiers can amplify the laser beam L1. Also, for example, the laser control unit 70 controls the master oscillator MO to emit the laser beam L1 in the burst period based on the light emission trigger signal S16. Also, for example, the laser control unit 70 controls the optical isolator 40 to transmit the laser beam L1 emitted from the master oscillator MO in the burst period and blocks the laser beam L1 in the burst intermission period based on the light emission trigger signal S16.

Also, for example, the laser control unit 70 recognizes the power of the return beam L2 based on the power-related signal S51 from the optical sensor 51, and compares the power of the return beam L2 with a threshold. The threshold is set, for example, according to laser resistance of the optical isolator 40. A plurality of thresholds such as output energy of the laser beam L1 or a length of the burst period, which differ depending on operation conditions of the laser apparatus 2, may be prepared in a memory or the like, and in operation or the like of the laser apparatus 2, the laser control unit 70 may read a threshold according to its operation condition from the memory or the like. If the power of the return beam L2 exceeds the threshold, the laser control unit 70 controls the master oscillator MO to stop emission of the laser beam L1, and controls the optical isolator 40 to block the laser beam L1. In this case, the laser control unit 70 controls the display device 60 to display predetermined contents to be reported to an operator.

The above control by the laser control unit 70 is merely exemplary, and different control may be added as required.

2.2 Operation

The burst signal S1 output from the exposure apparatus 3 and the droplet-related signal S15 output from the target sensor 15 are input to the EUV light generation control unit 16. The EUV light generation control unit 16 controls the target supply unit 12 based on the burst signal S1, the droplet-related signal S15, or the like, and adjusts output timing of the droplet DL, an output direction of the droplet DL, or the like. The EUV light generation control unit 16 outputs the light emission trigger signal S16 to the laser control unit 70 to perform the burst operation based on the burst signal S1 and the droplet-related signal S15.

The laser control unit 70 controls the first power supply PS1, the second power supply PS2, the third power supply PS3, and the fourth power supply PS4 before controlling the master oscillator MO so that the power amplifiers can amplify the laser beam L1. Then, the laser control unit 70 controls the master oscillator MO based on the light emission trigger signal S16 from the EUV light generation control unit 16, and causes the master oscillator MO to emit the laser beam L1 in the burst period. Also, the laser control unit 70 controls the optical isolator 40 based on the light emission trigger signal S16, and causes the optical isolator 40 to transmit the laser beam L1 traveling from the master oscillator MO to the optical isolator 40 in the burst period.

Part of the laser beam L1 having passed through the optical isolator 40 is reflected by the beam splitter BS, and amplified by the first power amplifier PA1, the second power amplifier PA2, the third power amplifier PA3, and the fourth power amplifier PA4. The laser beam L1 amplified by the fourth power amplifier PA4 is emitted from the fourth power amplifier PA4, reflected by the first mirror M1 and the second mirror M2, and enters the chamber 11 through the window W of the chamber 11. The laser beam L1 having entered the chamber 11 is focused on the plasma generating region 31 by the laser beam focusing optical system 32, and applied to at least one droplet DL supplied from the target supply unit 12.

The droplet DL irradiated with the laser beam L1 is turned into plasma, and light including EUV light is radiated from the plasma. The EUV light is selectively reflected by the reflection surface of the EUV light focusing mirror 33, focused on the intermediate focal point, and output to the exposure apparatus 3. A plurality of pulsed laser beams L1 may be applied to one droplet DL.

Part of the laser beam L1 applied to the droplet DL may be reflected, for example, by the droplet DL. In this case, the return beam L2 of the laser beam L1 reflected by the droplet DL travels through the laser beam focusing optical system 32, the second mirror M2, the first mirror M1, the fourth power amplifier PA4, the third power amplifier PA3, the second power amplifier PA2, and the first power amplifier PA1 to the beam splitter BS.

Part of the return beam L2 traveling through the first power amplifier PA1 to the beam splitter BS passes through the beam splitter BS and reaches the light receiving surface 51A of the optical sensor 51. The optical sensor 51 detects information on power of the return beam L2 on the light receiving surface 51A, and outputs the information as the power-related signal S51. The power-related signal S51 is input to the laser control unit 70.

The laser control unit 70 recognizes the power of the return beam L2 based on the power-related signal S51, and compares the recognized power of the return beam L2 with the threshold. If the power of the return beam L2 exceeds the threshold, the laser control unit 70 controls the master oscillator MO to stop emission of the laser beam L1, and controls the optical isolator 40 to block the laser beam L1. Then, the laser control unit 70 controls the display device 60 to display, for example, occurrence of an abnormal operation on the display screen.

3. Description of Return Beam Module of Comparative Example

Next, a return beam module of a comparative example will be described. Components similar to those described above are denoted by the same reference numerals, and overlapping descriptions are omitted unless otherwise stated.

3.1 Configuration

Figure 2:
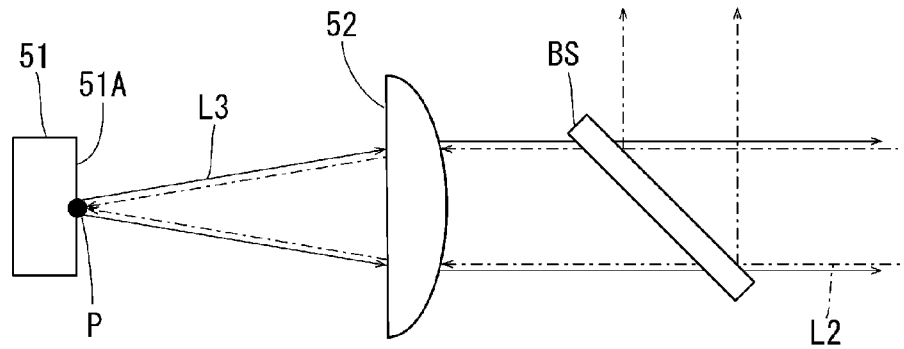
FIG. 2 diagrammatically shows a configuration of a return beam module of a comparative example.

FIG. 2 diagrammatically shows a configuration of a return beam module of the comparative example. As shown in FIG. 2, a return beam module 50 of the comparative example includes a beam splitter BS and an optical sensor 51 as described above. The return beam module 50 of the comparative example further includes a focusing lens 52. The focusing lens 52 is arranged between the beam splitter BS and the optical sensor 51. A light receiving surface 51A of the optical sensor 51 is arranged at a focusing position P of the focusing lens 52.

3.2 Operation

As described above, part of a return beam L2 traveling to the beam splitter BS passes through the beam splitter BS and is thus separated from an optical path of a laser beam L1. The return beam L2 separated from the optical path of the laser beam L1 is focused on the light receiving surface 51A of the optical sensor 51 by the focusing lens 52. The optical sensor 51 detects information on power of the return beam L2 focused on the light receiving surface 51A.

3.3 Problem

Part of the return beam L2 focused on the light receiving surface 51A of the optical sensor 51 by the focusing lens 52 may be reflected as a return beam L3 by the light receiving surface 51A as shown by a solid line in FIG. 2. In this case, the light receiving surface 51A of the optical sensor 51 is arranged at the focusing position P of the focusing lens 52, and thus most of the return beam L3 reflected by the light receiving surface 51A easily enters the optical path of the laser beam L1.

Thus, the light receiving surface 51A of the optical sensor 51 is easily optically coupled to a reflection surface from which the return beam L2 is generated, such as an optical element or a droplet DL on the optical path of the laser beam L1. Optical coupling of the light receiving surface 51A of the optical sensor 51 to the reflection surface from which the return beam L2 is generated causes self oscillation, and energy of the beam amplified by the self oscillation may overcome laser resistance of an optical isolator 40 or a master oscillator MO.

Then, embodiments below exemplify a laser apparatus including a return beam module that prevents self oscillation.

4. Description of Return Beam Module of Embodiment 1

4.1 Configuration

Figure 3:
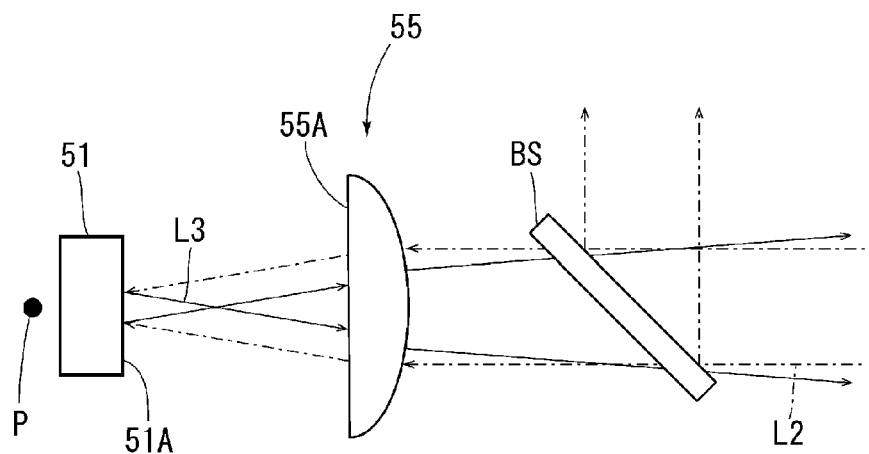
FIG. 3 diagrammatically shows a configuration of a return beam module of Embodiment 1.

FIG. 3 diagrammatically shows a configuration of a return beam module of Embodiment 1. As shown in FIG. 3, a return beam module 50 of Embodiment 1 includes a beam splitter BS and an optical sensor 51 as described above. The return beam module 50 of Embodiment 1 also includes a focusing optical system 55.

The focusing optical system 55 is arranged between the beam splitter BS and the optical sensor 51. The focusing optical system 55 includes one or more optical elements so as to focus a return beam L2 separated from an optical path of a laser beam L1 by the beam splitter BS. In Embodiment 1, the focusing optical system 55 includes one focusing lens 55A. In FIG. 3, the focusing lens 55A is a plano-convex lens, but may be a biconvex lens or a meniscus lens. A surface of the focusing lens 55A may have an AR (antireflection) coat. A light receiving surface 51A of the optical sensor 51 is arranged on a side closer to the focusing lens 55A than a focusing position P of the focusing lens 55A.

4.2 Operation

As described above, part of the return beam L2 traveling to the beam splitter BS is separated from the optical path of the laser beam L1 by the beam splitter BS. The return beam L2 separated from the optical path of the laser beam L1 is focused by the focusing lens 55A and enters the light receiving surface 51A of the optical sensor 51. The optical sensor 51 detects information on power of the return beam L2 having entered the light receiving surface 51A.

Part of the return beam L2 having entered the light receiving surface 51A of the optical sensor 51 may be reflected as a return beam L3 by the light receiving surface 51A as shown by a solid line in FIG. 3. In this case, the light receiving surface 51A of the optical sensor 51 is located on the side closer to the focusing lens 55A than the focusing position P of the focusing lens 55A, and thus the return beam L3 reflected by the light receiving surface 51A is diffused and travels through the focusing lens 55A to the beam splitter BS.

4.3 Effect

In the return beam module 50 of Embodiment 1, the light receiving surface 51A of the optical sensor 51 is arranged on the side closer to the focusing lens 55A than the focusing position P of the focusing lens 55A, and thus the return beam L3 reflected by the light receiving surface 51A is diffused. Thus, energy density of the return beam L2 entering the optical path of the laser beam L1 is lower than that when the light receiving surface 51A of the optical sensor 51 is arranged at the focusing position P of the focusing lens 52 as in the comparative example. This prevents the light receiving surface 51A of the optical sensor 51 from being optically coupled to, for example, a droplet DL from which the return beam L2 is generated on the optical path of the laser beam L1 to cause self oscillation. Therefore, the return beam module 50 of Embodiment 1 can prevent self oscillation.

4.4 Variant

Figure 4:
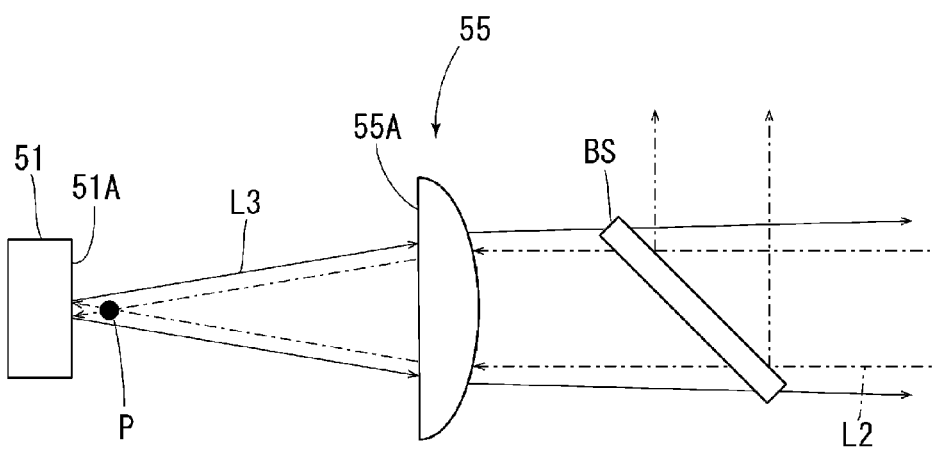
FIG. 4 diagrammatically shows a variant of the return beam module of Embodiment 1.

In Embodiment 1, the light receiving surface 51A of the optical sensor 51 is arranged on the side closer to the focusing lens 55A than the focusing position P of the focusing lens 55A. However, as shown in FIG. 4, the light receiving surface 51A of the optical sensor 51 may be arranged on the side farther from the focusing lens 55A than the focusing position P of the focusing lens 55A. In short, the light receiving surface 51A of the optical sensor 51 may be arranged at a position different from the focusing position P of the focusing optical system 55 on the optical path of the return beam L2.

When the light receiving surface 51A of the optical sensor 51 is arranged on the side closer to the focusing optical system 55 than the focusing position P of the focusing optical system 55, the return beam L3 reflected by the light receiving surface 51A can be more easily diffused than when the light receiving surface 51A of the optical sensor 51 is arranged on the side farther from the focusing optical system 55 than the focusing position P of the focusing optical system 55. This can further reduce the energy density of the return beam L3 entering the optical path of the laser beam L1. Thus, the light receiving surface 51A of the optical sensor 51 is preferably arranged on the side closer to the focusing optical system 55 than the focusing position P of the focusing optical system 55.

Figure 5:
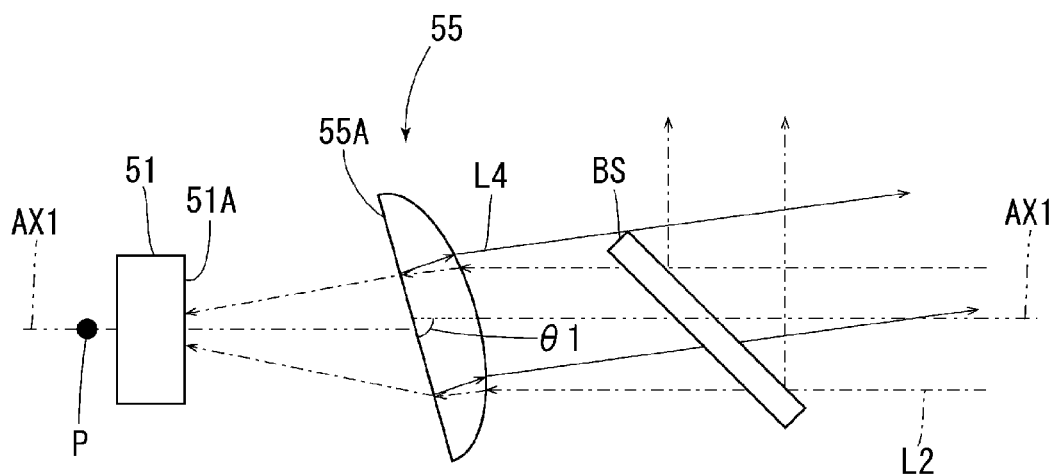
FIG. 5 diagrammatically shows another variant of the return beam module of Embodiment 1.

When the focusing lens 55A is a plano-convex lens, as shown in FIG. 5, a plane of the plano-convex lens may be arranged in an inclined manner with respect to an optical axis AX1 of the return beam L2 entering a convex surface of the plano-convex lens. For example, an angle θ1 between the optical axis AX1 and the plane is in the range of 87 to 88 degrees. With the plano-convex lens thus inclined, as shown by a solid line in FIG. 5, even if the return beam L2 entering through the convex surface of the plano-convex lens is internally reflected by the plane of the plano-convex lens, a return beam L4 internally reflected by the plane is diffused and travels to the beam splitter BS. This can reduce energy density of the return beam L4 entering the optical path of the laser beam L1.

5. Description of Return Beam Module of Embodiment 2

5.1 Configuration

Figure 6:
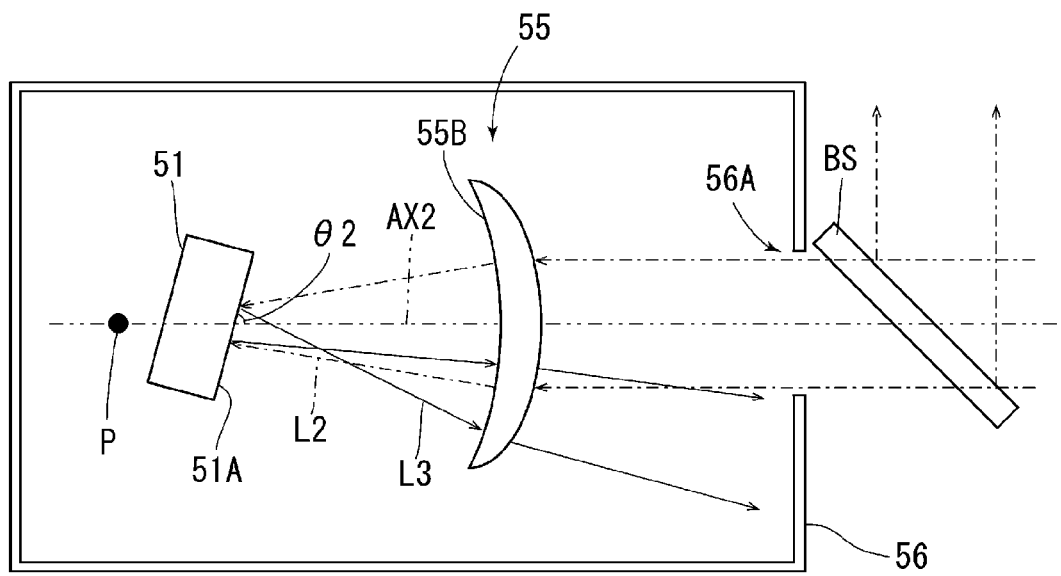
FIG. 6 diagrammatically shows a configuration of a return beam module of Embodiment 2.

FIG. 6 diagrammatically shows a configuration of a return beam module of Embodiment 2. As shown in FIG. 6, a return beam module 50 of Embodiment 2 includes a beam splitter BS, an optical sensor 51, and a focusing optical system 55 as in Embodiment 1.

A light receiving surface 51A of the optical sensor 51 is arranged in an inclined manner with respect to an optical axis AX2 of a return beam L2 entering the light receiving surface 51A. For example, an angle θ2 between the optical axis AX2 and the light receiving surface 51A is in the range of 85 to 90 degrees. Preferably, the angle θ2 between the optical axis AX2 and the light receiving surface 51A is in the range of 87 to 88 degrees. In FIG. 6, the light receiving surface 51A of the optical sensor 51 is arranged on a side closer to a focusing lens 55B than a focusing position P of the focusing lens 55B. However, the light receiving surface 51A may be arranged at the focusing position P in Embodiment 2 in which the light receiving surface 51A is arranged in an inclined manner with respect to the optical axis AX2.

A focusing optical system 55 includes one focusing lens 55B. The focusing lens 55B is a meniscus lens in FIG. 6, but may be a plano-convex lens or a biconvex lens. A surface of the focusing lens 55B may have an AR coat.

The return beam module 50 of Embodiment 2 further includes a cover 56 that covers the optical sensor 51 and the focusing lens 55B. The cover 56 has an opening 56A on the optical path of the return beam L2 between the beam splitter BS and the focusing lens 55B. Through the opening 56A, the return beam L2 separated from an optical path of a laser beam L1 by the beam splitter BS enters the focusing lens 55B in the cover 56. An absorption member that absorbs the return beam L2 can be arranged on at least an inner surface of the cover 56. For example, the absorption member can be arranged on the inner surface of the cover 56 by an inner wall of the cover 56 being subjected to black alumite treatment.

5.2 Operation

As described above, part of the return beam L2 traveling to the beam splitter BS is separated from the optical path of the laser beam L1 by the beam splitter BS. The return beam L2 separated from the optical path of the laser beam L1 is focused by the focusing lens 55B and enters the light receiving surface 51A of the optical sensor 51. The optical sensor 51 detects information on power of the return beam L2 having entered the light receiving surface 51A.

Part of the return beam L2 having entered the light receiving surface 51A of the optical sensor 51 through the focusing lens 55B may be reflected as a return beam L3 by the light receiving surface 51A as shown by a solid line in FIG. 6. In this case, the light receiving surface 51A of the optical sensor 51 is arranged in an inclined manner with respect to the optical axis AX2 of the return beam L2 entering the light receiving surface 51A, and thus the return beam L3 reflected by the light receiving surface 51A is diffused away from the optical axis AX2. Most of the return beam L3 diffused away from the optical axis AX2 is trapped in the cover 56, and if the absorption member is arranged on the inner surface of the cover 56, the absorption member absorbs the return beam L3.

5.3 Effect

In the return beam module 50 of Embodiment 2, the light receiving surface 51A of the optical sensor 51 is arranged in an inclined manner with respect to the optical axis AX2 of the return beam L2, and thus the return beam L3 reflected by the light receiving surface 51A is diffused away from the optical axis AX2.

Thus, energy density of the return beam L3 entering the optical path of the laser beam L1 is reduced. This prevents the light receiving surface 51A of the optical sensor 51 from being optically coupled to, for example, a droplet DL from which the return beam L2 is generated on the optical path of the laser beam L1 to cause self oscillation. Therefore, the return beam module 50 of Embodiment 2 can prevent self oscillation.

Also, in the return beam module 50 of Embodiment 2, the cover 56 having the opening 56A on the optical path of the return beam L2 between the beam splitter BS and the focusing lens 55B is arranged to cover the optical sensor 51 and the focusing lens 55B. Thus, the return beam module 50 of Embodiment 2 can shield an optical element or an optical component arranged outside the cover 56 from most of the return beam L3 reflected by the light receiving surface 51A of the optical sensor 51. Thus, the return beam module 50 of Embodiment 2 can reduce damage to the optical element or the optical component arranged outside the cover 56 caused by the return beam L3.

6. Description of Return Beam Module of Embodiment 3

6.1 Configuration

Figure 7:
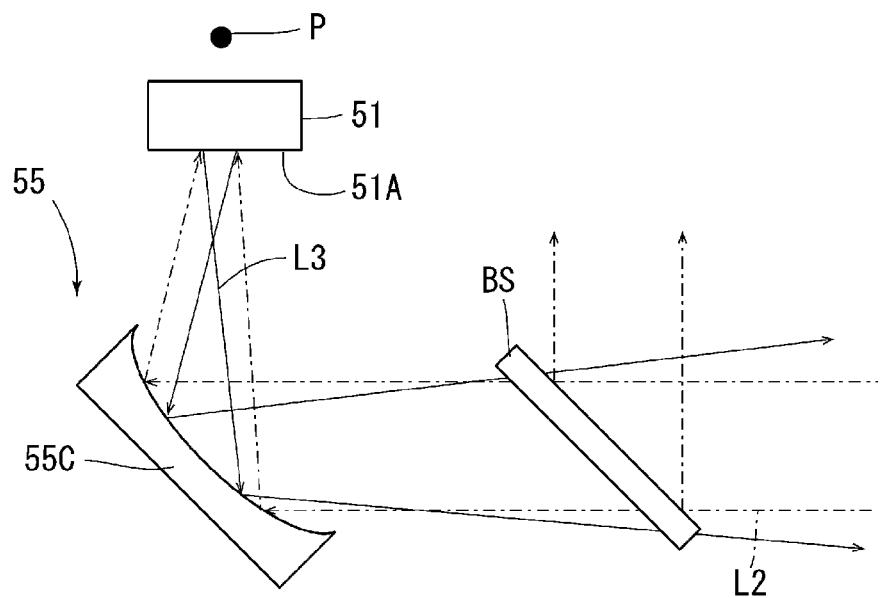
FIG. 7 diagrammatically shows a configuration of a return beam module of Embodiment 3.

FIG. 7 diagrammatically shows a configuration of a return beam module of Embodiment 3. As shown in FIG. 7, a return beam module 50 of Embodiment 3 includes a beam splitter BS, an optical sensor 51, and a focusing optical system 55 as in Embodiment 1.

The focusing optical system 55 includes one concave mirror 55C. The concave mirror 55C reflects and focuses a return beam L2 separated from an optical path of a laser beam L1 by a beam splitter BS and guides the return beam L2 to a light receiving surface 51A. The light receiving surface 51A of the optical sensor 51 is arranged on a side closer to the concave mirror 55C than a focusing position P of the concave mirror 55C.

6.2 Operation

As described above, part of the return beam L2 traveling to the beam splitter BS is separated from the optical path of the laser beam L1 by the beam splitter BS. The return beam L2 separated from the optical path of the laser beam L1 is reflected and focused by a concave surface of the concave mirror 55C and enters the light receiving surface 51A of the optical sensor 51. The optical sensor 51 detects information on power of the return beam L2 having entered the light receiving surface 51A.

Part of the return beam L2 having entered the light receiving surface 51A of the optical sensor 51 may be reflected as a return beam L3 by the light receiving surface 51A as shown by a solid line in FIG. 7. In this case, the return beam L3 reflected by the light receiving surface 51A is reflected by the concave surface of the concave mirror 55C and diffused and travels to the beam splitter BS.

6.3 Effect

In the return beam module 50 of Embodiment 3, the focusing optical system 55 is the concave mirror 55C, and thus the return beam L3 reflected by the light receiving surface 51A is diffused by the concave mirror 55C.

Thus, energy density of the return beam L3 entering the optical path of the laser beam L1 is reduced. This prevents the light receiving surface 51A of the optical sensor 51 from being optically coupled to, for example, a droplet DL from which the return beam L2 is generated on the optical path of the laser beam L1 to cause self oscillation. Therefore, the return beam module 50 of Embodiment 3 can prevent self oscillation.

When the focusing optical system 55 is a focusing lens, a surface through which the return beam L2 enters the focusing lens and a surface through which the return beam L2 is emitted from the focusing lens both serve as reflection surfaces for the return beam L2. On the other hand, in Embodiment 3, the focusing optical system 55 is the concave mirror 55C, and thus the reflection surface for the return beam L2 by the focusing optical system 55 is only one concave surface. Thus, the return beam module 50 of Embodiment 3 can reduce the number of times of reflection of the return beam L2 by the focusing optical system 55.

7. Description of Return Beam Module of Embodiment 4

7.1 Configuration

Figure 8:
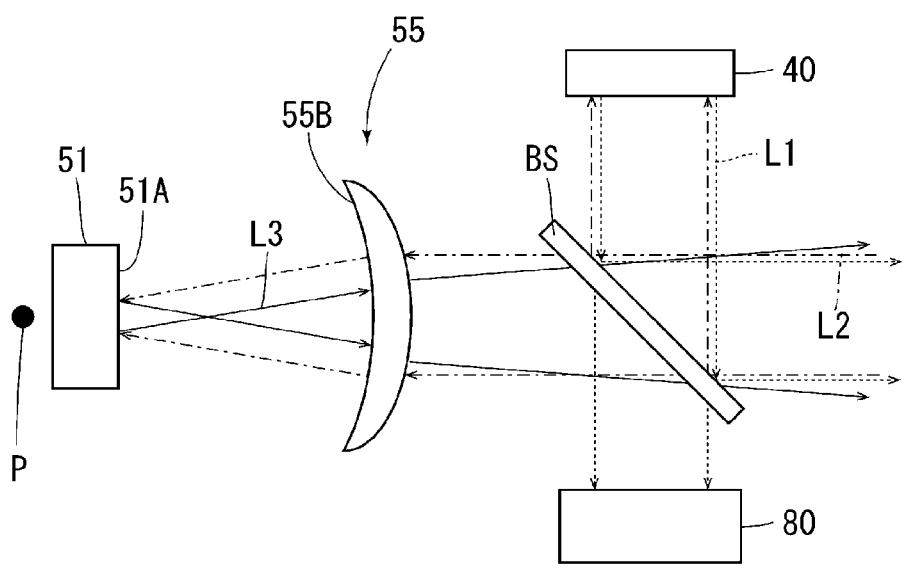
FIG. 8 diagrammatically shows a configuration of part of a laser apparatus of Embodiment 4.

FIG. 8 diagrammatically shows a configuration of part of a laser apparatus of Embodiment 4. As shown in FIG. 8, a laser apparatus 2 of Embodiment 4 further includes an optical sensor 80 in addition to the return beam module 50 in FIG. 1.

The optical sensor 80 is configured to monitor a laser beam L1 passing through a beam splitter BS. For example, the optical sensor 80 may include a beam splitter, a transfer lens, a position sensor, a focusing lens, and a pointing sensor.

7.2 Operation

The laser beam L1 from the optical isolator 40 reflected by the beam splitter BS travels to a first power amplifier PA1 as described above. The laser beam L1 from the optical isolator 40 passing through the beam splitter BS travels to the beam splitter of the optical sensor 80.

The laser beam L1 reflected by the beam splitter of the optical sensor 80, for example, enters the transfer lens and is transferred to a light receiving surface of the position sensor. The position sensor outputs, to a laser control unit 70, energy distribution of the laser beam L1 transferred to the light receiving surface as an image signal.

The laser beam L1 transmitted by the beam splitter of the optical sensor 80, for example, enters the focusing lens and is focused on a light receiving surface of the pointing sensor. The pointing sensor outputs, to the laser control unit 70, energy distribution of the laser beam L1 focused on the light receiving surface as an image signal.

The laser control unit 70 controls an actuator (not shown) connected to each of a first mirror M1 and a second mirror M2 based on the image signals from the position sensor and the pointing sensor, and adjusts a beam traveling direction or the like.

7.3 Effect

The laser apparatus 2 of Embodiment 4 uses the beam splitter BS to separate the laser beam L1 to be detected by the optical sensor 80 from the optical path of the laser beam L1, and uses the beam splitter BS to separate a return beam L2 to be detected by an optical sensor 51 from the optical path of the laser beam L1. Thus, the laser apparatus 2 of Embodiment 4 can use one beam splitter BS to monitor the laser beam L1 with the optical sensor 80 and monitor the return beam L2 with the optical sensor 51. Thus, the laser apparatus 2 of Embodiment 4 can reduce light amount loss of the beam splitter as compared to a case where separate beam splitters for monitoring the laser beam L1 and monitoring the return beam L2 are arranged.

The above descriptions are intended to be illustrative only and not restrictive. Thus, it will be apparent to those skilled in the art that modifications may be made in the embodiments or the variants of the present disclosure without departing from the scope of the appended claims.

The terms used throughout the specification and the appended claims should be interpreted as "non-limiting." For example, the term "comprising" or "comprised" should be interpreted as "not limited to what has been described as being comprised." The term "having" should be interpreted as "not limited to what has been described as having". Further, the modifier "a/an" described in the specification and the appended claims should be interpreted to mean "at least one" or "one or more".

What is claimed is:

1. A laser apparatus comprising:
a master oscillator configured to emit a laser beam;
an amplifier arranged on an optical path of the laser beam emitted from the master oscillator;
a beam splitter arranged between the master oscillator and the amplifier, and configured to separate, from the optical path of the laser beam, at least part of a return beam traveling through the optical path of the laser beam in a direction opposite to a traveling direction of the laser beam;
a focusing optical system configured to focus the return beam separated from the optical path of the laser beam by the beam splitter; and
an optical sensor having a light receiving surface for the return beam, and configured to detect information on power of the return beam entering the light receiving surface through the focusing optical system,
wherein the light receiving surface is arranged on a side closer to the focusing optical system than a focusing position of the focusing optical system, and
the beam splitter is arranged so that the return beam reflected by the light receiving surface is diffused and enters the beam splitter.

2. The laser apparatus according to claim 1, wherein the focusing optical system is a plano-convex lens, and a plane of the plano-convex lens is arranged in an inclined manner with respect to an optical axis of the return beam entering the plano-convex lens.

3. The laser apparatus according to claim 1, wherein the light receiving surface is arranged in an inclined manner with respect to an optical axis of the return beam entering the light receiving surface.

4. The laser apparatus according to claim 1, wherein the focusing optical system is a concave mirror configured to reflect and focus the return beam and guide the return beam to the light receiving surface.

5. The laser apparatus according to claim 1, further comprising an optical isolator arranged between the master oscillator and the beam splitter.

* * * * *